Feb. 15, 1949.  A. U. BRYANT  2,461,960
EGG CLEANING APPARATUS
Filed July 13, 1945
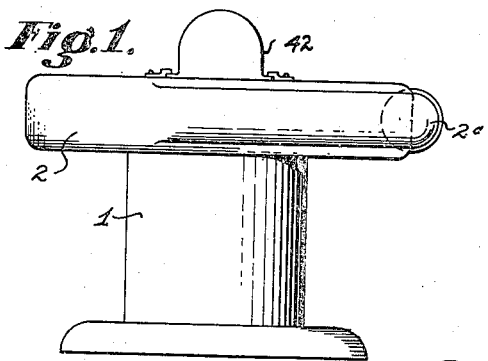
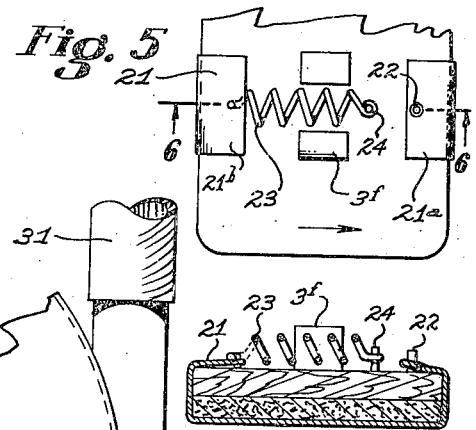
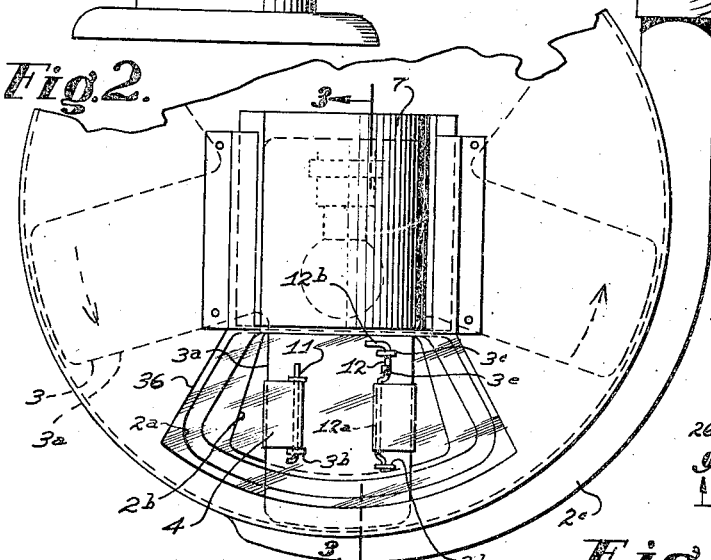
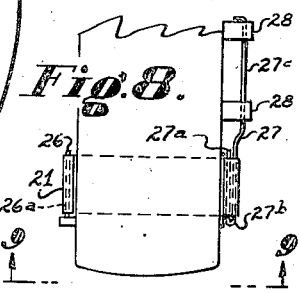
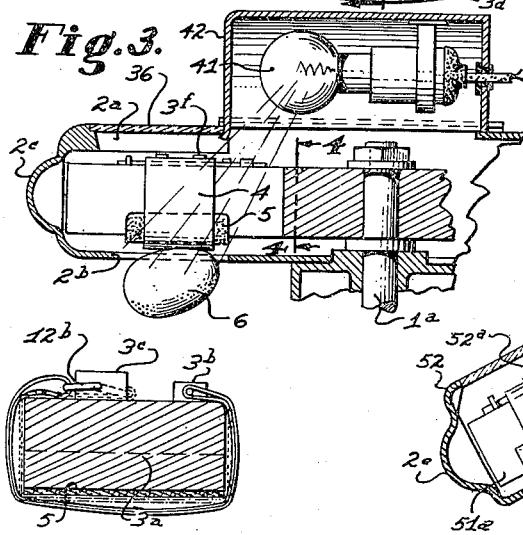
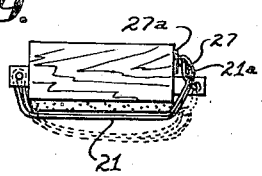
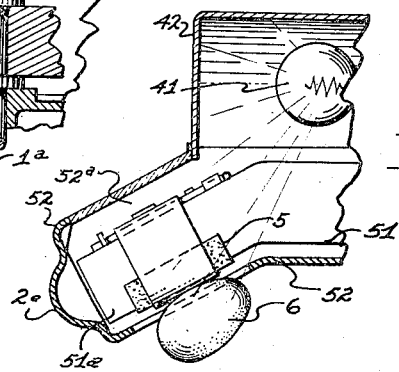
INVENTOR.
BY AUSTIN U. BRYANT
William B Hall
ATTORNEY.

Patented Feb. 15, 1949

2,461,960

UNITED STATES PATENT OFFICE 2,461,960

EGG CLEANING APPARATUS

Austin U. Bryant, Alameda, Calif.

Application July 13, 1945, Serial No. 604,766

9 Claims. (Cl. 51—109)

My invention relates to an egg cleaning apparatus of the type in which the egg is manually applied to a cleaning means.

One of the principal objects of this invention is to provide an egg cleaning apparatus in which the egg may be held against a cleaning element for cleaning the soiled surface of the egg, and in which the egg, and particularly the surface thereon to be cleaned, may be viewed at all times during the cleaning operation.

A novel feature of this invention is the provision of an egg cleaning apparatus of this class, in the form of a vertical rotor having radiating arms provided at the inner side with egg cleaning elements in the form of abrasive members, and in which the arms are so arranged that an egg held against the abrasive members may be seen at all times through the space between the arms while the rotor is revolving.

An important object of this invention is the provision of a protective enclosure for such rotor, and one in which there is provided a small opening at the lower or inner side thereof through which the eggs may be held against the revolving abrasive means of the rotor, the opening being sufficiently small as to prevent the eggs or hand from being thrust thereinto, thereby avoiding danger of injury to either, and in which there is provided a window at the outer side of the enclosure through which the egg cleaning operation may be readily seen.

Another important object of this invention is to provide an apparatus of this class which is supported on or by the motor operating the same.

An important object also of this invention is to provide a novel enclosure for the egg cleaning rotor which serves as a fan for disposing of the dust from the egg cleaning operation.

A further important object of this invention is to provide a novelly arranged means for illuminating the egg during such cleaning operation.

A still further important object of this invention is to provide novel means of removably applying abrasive egg-cleaning members to the arms of the rotor of the machine.

With these and other objects in view, as will appear hereinafter, I have devised an egg cleaning apparatus, as will be described in detail hereafter and particularly set forth in the appended claims, reference being had to the accompanying drawings, and to the characters of reference thereon, which form a part of this application, in which:

Fig. 1 is a front elevation of my egg cleaning apparatus in a preferred form;

Fig. 2 is a plan view thereof, portions being broken away and in section to facilitate the illustration;

Fig. 3 is a fragmentary sectional elevational view thereof, taken through 3—3 of Fig. 2;

Fig. 4 is a transverse sectional view of one of the arms of the rotor taken through 4—4 of Fig. 2;

Fig. 5 is a plan view of one of the arms of the rotor, showing a slightly modified form of means for securing the abrasive member thereon;

Fig. 6 is a transverse sectional view thereof, similar to Fig. 3, showing the modified form of construction of Fig. 5;

Fig. 7 is a fragmentary sectional elevational view of a slightly modified form of construction of the rotor and the enclosure;

Fig. 8 is a fragmentary plan view of an arm of the rotor showing another slightly modified form of the means for removably securing or fastening the abrasive member thereon; and, Fig. 9 is an end elevation thereof, the securing or fastening means abrasive member being shown by dotted lines in a loosened position.

As shown in Fig. 1, my egg cleaning apparatus is supported on a pedestal 1 which is the motor for operating the machine or apparatus. The housing of the motor is adapted to support the apparatus on a table or other suitable means. On the upper end of the housing of the motor is coaxially mounted the enclosure 2 for the cleaning means, the enclosure being of considerably greater lateral extent than the motor. On the shaft $1^a$ of the motor is mounted the rotor 3 having a plurality of large radiating arms $3^a$, presenting a star wheel in appearance. The ends of the arms extend substantially to the inner surface of the enclosure, except as will be hereinafter more specifically described.

In the upper wall of the enclosure is provided a window $2^a$, and in the lower wall of the enclosure, directly below this window, is an opening $2^b$. Both the window and the opening are positioned near the periphery of the enclosure and at the near side thereof so that the operator of the apparatus may readily look through the window toward the opening $2^b$.

Extending transversely around each arm of the rotor is an egg cleaning element 4 which is in the form of an abrasive member, and preferably emery cloth. The abrasive member is drawn against a readily yieldable pad 5 at the underside of the arm, such yieldable element being preferably felt, sponge rubber, or the like. The abrasive member is drawn around the lower side of the arm and the ends thereof are secured at the upper side, which will be hereinafter referred to as the backside of the arm. The operator may stand at one side of the apparatus and hold the egg to be cleaned, designated 6 in the drawings, against the abrasive member 4, through the opening 2ᵇ, and the operation may be viewed through the opening 2ᵃ and through the space between adjacent arms 3ᵃ.

In the preferred form of construction, the abrasive member is in the form of a continuous or loop shaped band and the same is folded together and held in position against the pad by rods 11 and 12 extending through the ends of the loop of the member 4, as shown best in Figs. 2 and 4. The rod 11 may be located by or extend through eyes 3ᵇ near one edge of the backside of the arm 3ᵃ. The rod 12 is rotatably mounted at its inner end in a lug 3ᶜ. The outer end and the intermediate portion of the rod may be rotatably mounted in or rest against other lugs 3ᵈ and 3ᵉ near the opposite edge of the backside of the arm. The portion of the rod 12 intermediate the lugs 3ᵈ and 3ᵉ has an offset or eccentric portion 12ᵃ around which the other end of the looped abrasive element extends. The inner end of the rod 12 has a handle portion 12ᵇ whereby the rod 12 may be rocked from one position, shown by solid lines in Fig. 1, to a substantially diametrically opposite position, shown by dotted lines, in which position the abrasive element 4 is tightened.

In the modified form, shown in Figs. 5 and 6, the opposite ends of the abrasive band 21 are resiliently drawn together by a tension spring 23, which is located between spaced lugs 3ᶠ at the backside of the arm for locating the abrasive member against outward movement by centrifugal force. One, and preferably the leading end 21ᵃ, is secured to a pin 22 while the opposite end 21ᵇ is connected by the spring 23 to another pin 24.

In the other modified means for removably fastening the abrasive member, which is also in the form of a loop 21, the ends as shown extending only to the opposite edges. One end is placed over a rod 26 supported only at the end 26ᵃ near the radially outer end of the arm. The other end 21ᵃ of the looped abrasive member 21 is threaded over one leg 27ᵃ of a resilient U-shaped wire member 27. When the member 21 is tightened the end portion 21ᵃ extends over the leg 27ᵇ, as shown best in Fig. 9. The leg 27ᵇ has a straight but offset bearing or supporting shank 27ᶜ which is rotatably mounted on a pair of lugs 28 at one edge of the rotor arm, as shown in Fig. 8. The end 21ᵃ is held tightly in place by an over-center action—the end 21ᵃ being held at the inner side of the axis of the rotating shank 27ᶜ against the adjacent edge of the rotor arm. Since the member 27 is resilient, the end 21ᵃ of the member 21 may be readily drawn over or past the center or axis of the shank. The bending of both legs 27ᵃ and 27ᵇ equalizes the tension at both edges of the member 21.

The enclosure 2 is constructed in the form of a fan housing, one portion thereof being extended radially, as indicated by 2ᶜ, so as to provide a channel outwardly from the ends of the arms 3ᵃ, the channel commencing from approximately opposite the opening 2ᵇ, and extending circumferentially around the enclosure in the direction of the movement of the rotor. The arms 3ᵃ serve as impellers of a fan for drawing air through the opening 2ᵇ and directing the dust, accumulated from the cleaning of the eggs, and forcing the same centrifugally around the enlargement or channel 2ᶜ to the discharge end of the enclosure. To said discharge end may be connected a conduit 31 for directing away the dust of the machine.

In the window opening 2ᵃ of the enclosure is preferably provided a transparent plate 36 to close the upper opening and thereby facilitate air being drawn into the lower opening 2ᵇ.

Above the enclosure is an illuminating means which may be in the form of an electric light bulb 41. This bulb is located within a hood or shade 42 so that light from the bulb is directed toward the cleaning means on the rotor and towards the opening 2ᵇ, so as to illuminate the egg 6 held against the cleaning means through the opening. The hood 42 is adapted to be drawn backwardly to facilitate replacing of the bulb.

In the modified structure, shown in Fig. 8, the peripheral portion 51ᵃ of the rotor 51 is directed downwardly at a slight angle, and the enclosure 52 therefor is correspondingly directed downwardly. With this structure, the opening 52ᵃ at the upper side of the enclosure is so located that the operator may look directly through the opening in order more readily to see the egg 6 at the underside of the rotor.

The speed of the rotor is such that the eggs or fingers of the hand holding the eggs cannot be easily thrust into the housing through the opening 2ᵇ while the rotor is revolving. The speed is sufficiently great that the rotor arms cannot be readily seen while the rotor is revolving.

I have also found that black or a dark color paint on the rotor also reduces visibility of the latter and augments visibility of the egg.

Though I have shown a particular construction, combination, and arrangement of parts and portions of my egg cleaning apparatus, I do not wish to be limited to the same, but desire to include in the scope of my invention the construction, combination, and arrangement of parts and portions, substantially as set forth in the appended claims.

I claim:

1. An egg cleaning apparatus, comprising a rotor mounted on a vertical axis and having radiating arms arranged in a plane substantially perpendicular to the axis of the rotation of the rotor, an abrasive means at the underside of the arms, an enclosure for the rotor, said enclosure having a window at the upper side, above the path of the abrasive means on the arms, and an opening at the underside below the window, an upright motor axially connected with said rotor, the housing of said motor forming the supporting pedestal for the apparatus, the enclosure being axially supported at the upper end of the motor housing.

2. An egg cleaning apparatus, comprising a rotor mounted on a vertical axis and having radiating arms arranged in a plane substantially perpendicular to the axis of the rotation of the rotor, an abrasive means at the underside of the arms, an enclosure for the rotor, said enclosure having a window at the upper side, above the path of the abrasive means on the arms, and an opening at the underside below the window, the enclosure being radially enlarged at the portion beginning approximately opposite the opening and extending circumferentially therefrom in the direction of the rotation of the rotor, the arms of said rotor forming impellers of a fan for draw-